(12) United States Patent
Howard et al.

(10) Patent No.: US 6,519,647 B1
(45) Date of Patent: Feb. 11, 2003

(54) METHODS AND APPARATUS FOR SYNCHRONIZING ACCESS CONTROL IN A WEB SERVER

(75) Inventors: Michael Howard, Redmond; Don L. Brown, Bothell; Quentin J. Clark, Bellevue; Lara N. Dillingham, Seattle; Ronald Meijer, Kirkland; Boyd C. Multerer, Seattle; Timothy D. Sellers, North Bend, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,880

(22) Filed: Jul. 23, 1999

(51) Int. Cl.⁷ ................................................ G06F 15/16
(52) U.S. Cl. ...................... 709/229; 709/203; 709/225; 709/248; 713/200; 713/201
(58) Field of Search .................................. 709/229, 224, 709/203, 219, 225, 230, 228, 248; 713/200–202

(56) References Cited

U.S. PATENT DOCUMENTS 6,161,146 A * 12/2000 Kley et al. .................. 709/248
6,321,334 B1 * 11/2001 Jerger et al. ................ 713/200

* cited by examiner

Primary Examiner—Ario Etienne
(74) Attorney, Agent, or Firm—Lee & Hayes, PLLC (57) ABSTRACT

Methods and apparatus for synchronizing access control in a web server are described. A plurality of security scenarios are defined, each of which has one or more security settings associated therewith. The security settings are those that are associated with a plurality of access control mechanisms that control access to a web server or to resources that are used by the web server. One or more of the security settings for one or more of the access control mechanisms are set when a security scenario is selected. Thus, the security settings for a number of different access control mechanisms can be set contemporaneously by selecting one security scenario.

36 Claims, 8 Drawing Sheets

METHODS AND APPARATUS FOR SYNCHRONIZING ACCESS CONTROL IN A WEB SERVER

TECHNICAL FIELD

This invention relates to methods and apparatus for synchronizing access control in a web server.

BACKGROUND

Web servers are computer systems that support web sites. Web sites typically include a number of resources that are used to build the web site. Files are one example of a resource that can be used to build a web site. It is highly desirable to protect the content of and access to a web site so that unauthorized individuals cannot access and manipulate web site resources.

Figure 1:
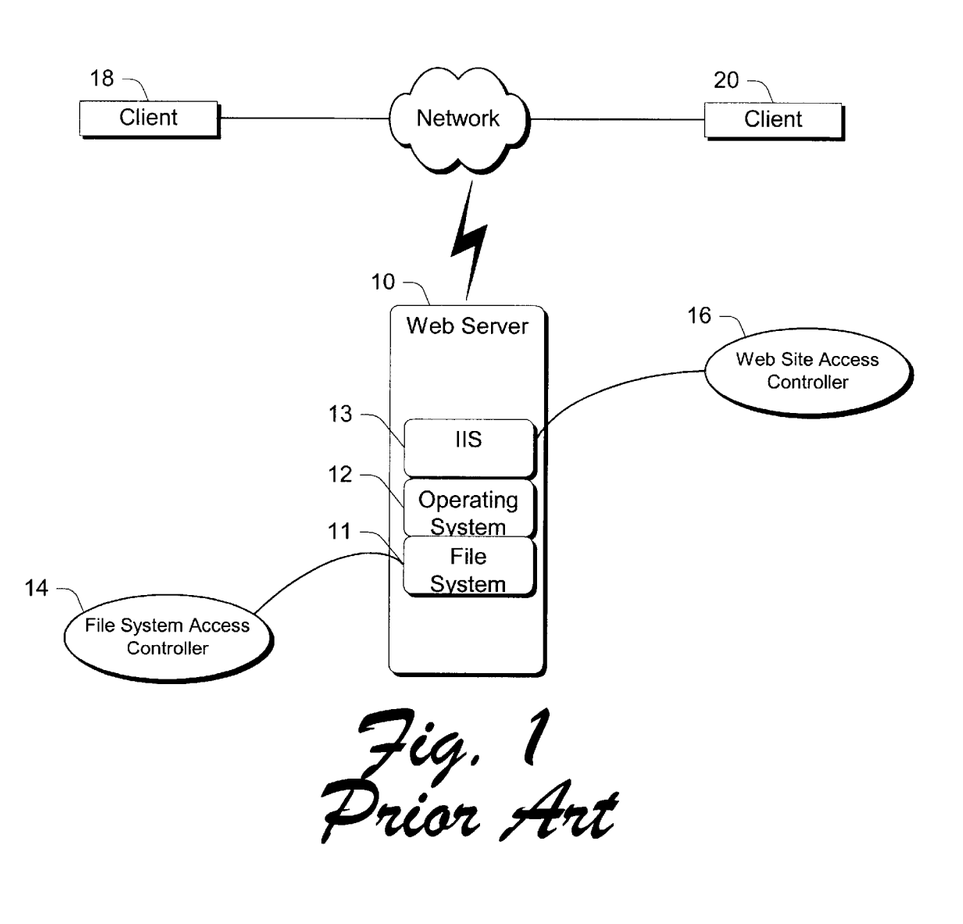
FIG. 1 illustrates one access control security system in accordance with the prior art.

Various security schemes have evolved to give web site administrators the ability to protect the resources on their web sites. Often times more than one security scheme can be used in conjunction with another, and often times the different security schemes are set at different places within a system. For example, FIG. 1 shows an exemplary system that can include different security schemes that can be set from different places within the system. These security schemes are not synchronized and because of this, problems can arise for both the system administrator and product service engineers who might be called upon to assist a system administrator when problems arise. In this example, a server 10 includes a file system 11, an operating system 12 that can be used to operate on the file system, and an internet information server 13, such as Microsoft's Internet Information Service that manages internet access for a plurality of different clients 18, 20. In this example, file system 11 has a file system access controller 14 that is used by a system administrator to set security access for the file system. For example, read and write access can be set through the file system access controller 14 and specifies what privileges the various clients of the system have. Additionally, a web site access controller 16 is provided and is used by the internet information server 13 to determine which of the various clients can access a particular web site and what operations are allowed on particular resources that are accessible through the web site. Here too, read and write access can be set for particular files. The security settings that are set by the file system access controller 14 can, in some instances, conflict with the security settings that are set by the web site access controller 16. For example, if the file system access controller sets a "read only" setting on a particular file (e.g. "file"), and the web site access controller 16 sets a "read and write" setting for the same file, then when a client attempts to write to "http://www.file.com", the request will fail because the file system access controller 14 has placed a more restrictive security setting on the particular file than the web site access controller 16. This is a very elementary example—but is one that illustrates just how easily unsynchronized, inconsistent security settings can arise. These inconsistencies can lead to customer dissatisfaction and increased time for support calls to assist the customer in sorting out the inconsistent security settings. Administrators of secure products can become frustrated and support costs can escalate when any product has more than one tool or scheme to maintain and/or enforce security policy, such as access control or authentication.

This invention arose out of concerns associated with providing a simple, easy-to-use tool for synchronizing access control in a Web server that includes a plurality of different access control mechanisms.

SUMMARY

Methods and apparatus for synchronizing access control in a Web server are described. In one embodiment, a plurality of security scenarios are defined and each scenario has one or more security settings associated with it. The security settings are associated with a plurality of access control mechanisms that control access to a web server and/or its resources. One or more of the security settings for a plurality of the access control mechanisms are automatically set when a security scenario is selected by a user. Thus, the security settings for a number of different access control mechanism can be set contemporaneously by selecting one security scenario. This avoids having to individually set security settings for each of the access control mechanisms and can ensure that the individual settings are proper.

Among the various access control mechanisms that can be set by selection of an appropriate security scenario are: authentications for authenticating various users, Web permissions that define what particular operations are allowed on particular resources, access restrictions that can permit or deny access to a Web site based upon an identification that is associated with a particular user, and access control lists (ACLs) that include user information and privileges that are associated with a particular resource.

In addition, in some embodiments third party security access control mechanisms that control access to resources that are not managed or controlled by the web server can be set.

Further, in some embodiments various locations within a hierarchical name space can inherit the security settings from one or more upstream locations in the hierarchical name space.

DETAILED DESCRIPTION

Overview

The embodiments of the invention described below provide various methods and systems of synchronizing access control to resources that are controlled by a web server and/or used by or accessible through a web server. Access control is exercised by controlling security settings for a plurality of access control mechanisms. The access control mechanisms control access to various resources. Rather than individually setting the security settings for each access control mechanism, a singular, unified approach is presented that allows a plurality of the access control mechanisms to be set. Various security scenarios can be provided, each of which is associated with defined security settings for a plurality of the access control mechanisms. For example, one scenario might have a low degree of security associated with it while another scenario might have a high degree of security associated with it. Hence, a system administrator is able to simultaneously manage multiple different security systems that are all involved in web access during different stages of processing a web request.

Users are also given an option of changing the security settings that are associated with individual security scenarios. This provides for flexibility and a robust collection of user-definable security scenarios. In addition, the concept of inheritance is utilized to provide security settings from one location along a hierarchical namespace to another location along the namespace. That is, downstream namespace locations can inherit the security settings for the access control mechanisms that are associated with upstream namespace locations. This option provides a quick and convenient way to define security settings for hierarchical namespace locations and addresses situations where a particular security setting works well at an upstream namespace location and it is desired to configure a downstream location with that security setting.

Synchronization of access control mechanisms greatly mitigates the effects of unsynchronized access control, an example of which is given in the "Background" section above in connection with security settings for a file system and web access. In the present invention, one security scenario, e.g. a read only scenario, can be defined for both the file system and web access. When the security scenario is selected by a system administrator, the security scenario simultaneously sets the security settings for both the file system and web access as read only. Hence, the security settings are synchronized so that inconsistencies such as those mentioned above cannot arise. In addition, synchronizing the security settings is also beneficial from the standpoint of troubleshooting problems that might arise due to an administrator's customization of the security settings. Specifically, the synchronized settings define a starting point for the security settings. If a user customizes their settings over those that are defined at the starting point, then if problems arise, such as those associated with inconsistent settings, troubleshooting is much easier. Specifically, since a defined starting point is known, a troubleshooter can more quickly trace a problem by starting at the starting point, rather than at each of the individual settings that might have been set by the administrator.

Computer System

Figure 2:
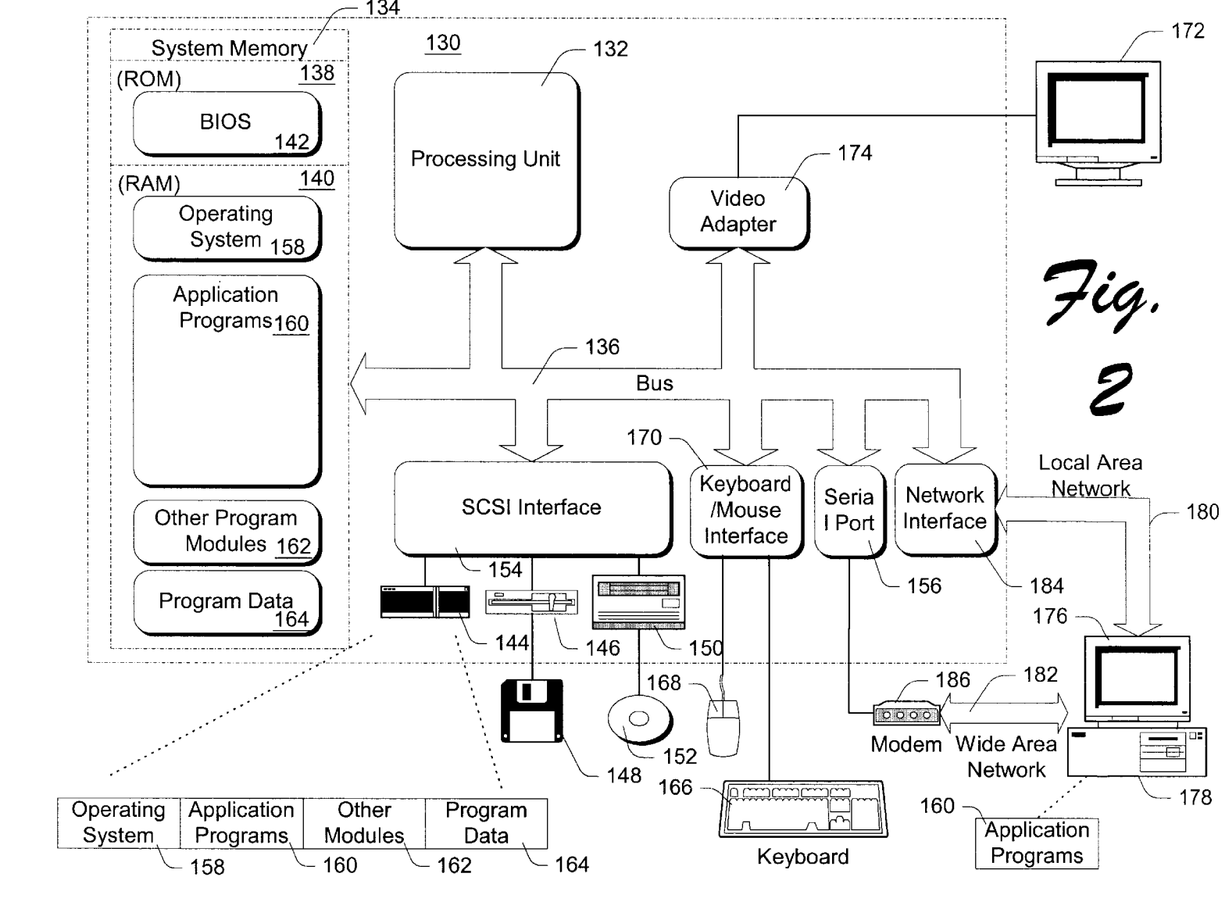
FIG. 2 is an exemplary computer system that can be used in connection with various embodiments of the invention.

Preliminarily, FIG. 2 shows a general example of a computer 130 that can be used in accordance with the invention to implement one or more web servers. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Access Control Mechanisms

Figure 3:
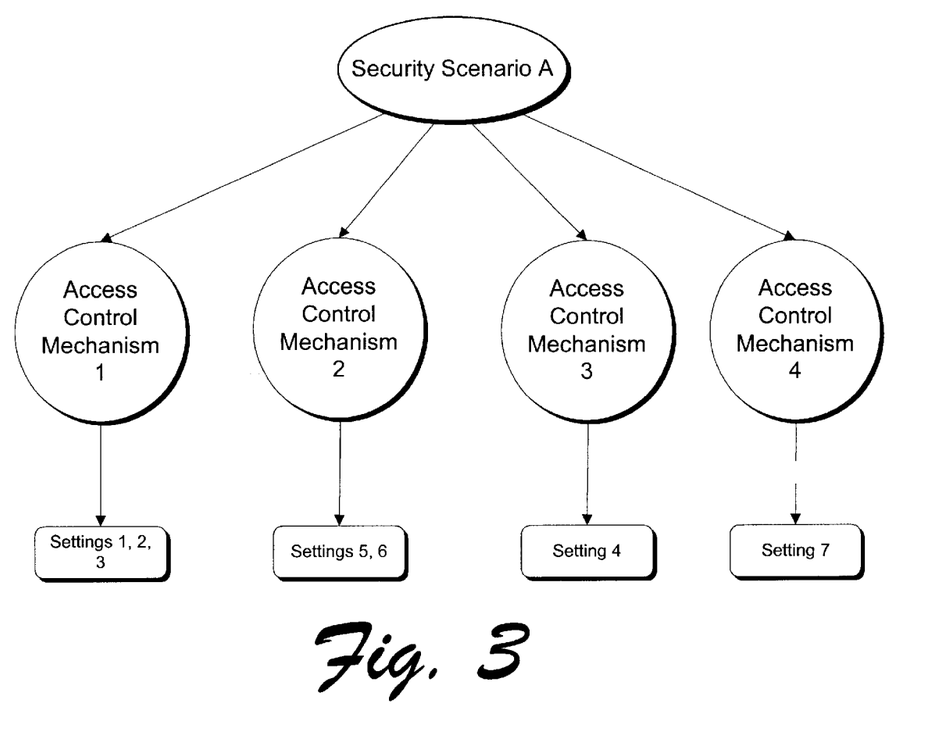
FIG. 3 is a diagram that shows an association between an exemplary security setting and their associated access control mechanism settings.
Figure 4:
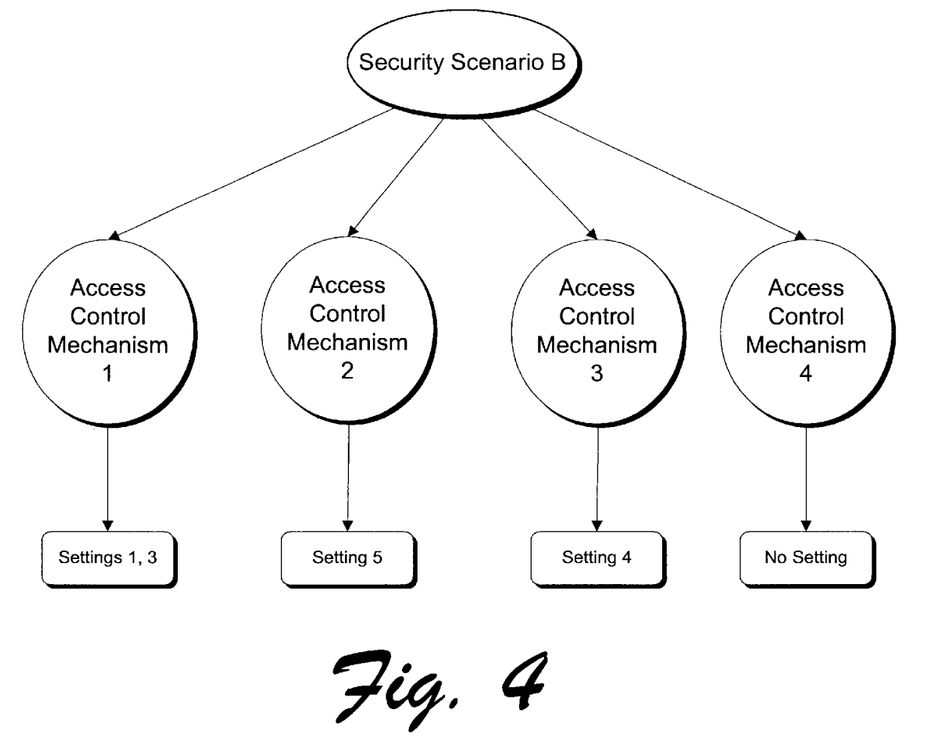
FIG. 4 is a diagram that shows an association between an exemplary security setting and their associated access control mechanism settings.

FIGS. 3 and 4 show security settings for two different security scenarios, generically referred to as "Security Scenario A" and "Security Scenario B". Each of the security scenarios sets the security settings for a plurality of different access control mechanisms—here designated as Access Control Mechanisms 1–4. Any number of security scenarios can be provided. The security scenarios can be defined in terms of different levels of security that can be provided. For example, one security scenario can be associated with a "public" web site and carry with it a very low degree of security. Another security scenario can be associated with a secure web site and carry with it a much higher degree of security. Each security scenario has one or more security settings associated with it. These security settings correspond to settings for a plurality of access control mechanisms that control access to resources in or accessible through a web server.

FIG. 3 shows that security scenario A controls the security settings for access control mechanisms 1, 2, 3 and 4. Each access control mechanism has one or more settings that can be automatically or simultaneously set and synchronized by selecting security scenario A. For example, access control mechanism 1 has settings 1, 2 and 3 that are set when a user selects security scenario A. Similarly, access control mechanism 2 has security settings 5 and 6 set when a user selects security scenario A. Likewise, access control mechanism 3 has security setting 4 and access control mechanism 4 has security setting 7 set when a user selects security scenario A. FIG. 4 shows the security settings that are associated with security scenario B. Specifically, access control mechanism 1 has settings 1 and 3; access control mechanism 2 has setting 5; access control mechanism 3 has setting 4; and access control mechanism 4 has no setting when security scenario B is selected by a user. The security settings for a plurality of different access control mechanisms are simultaneously and automatically set when a user selects a certain security scenario.

The security scenarios discussed above can be used in connection with any suitable web server, and in connection with any suitable number and type of access control mechanisms. In the described embodiment, various methods and systems are implemented in connection with Microsoft's Internet Information Server (IIS) 5.0 that runs on top of the Windows NT operating system, and the various security features it offers. It is to be understood, however, that this constitutes but one exemplary operational implementation and is not intended to limit the principles of the invention to IIS 5.0, or, for that matter, to any particular Microsoft product.

Several access control mechanisms exist for use with IIS 5.0 and include authentications, web permissions, access control lists for the NT file system (NTFS), and internet protocol restrictions. Each of these are explained in more detail below.

Authentications

Authentication is simply a way to authenticate a particular user. Many methods of authentication exist. Anonymous authentication is one type of authentication that is appropriate for a public web site. This allows everyone to have access to the resources on that site. For sites that contain confidential information, however, access can be controlled more carefully. For example, in the Windows NT environment there are four authentication options: Windows NT Challenge/Response authentication, Basic authentication, client certificate mapping, or a custom authentication application such as an ISAPI filter.

Windows NT Challenge/Response authentication uses Windows NT user accounts directly, and does not transmit logon information, such as the user name and password, over the network. This is important to safeguard the user names and passwords of clients. Also, because this type of authentication uses individual user accounts, there is a great deal of flexibility over the access level of those clients.

Challenge/Response authentication uses hashing technology to transmit credential information. In the hashing process, a copy of a plain text message is run through a mathematical operation and results in a hash value that is usually 128–160 bits long. The hash value is said to be one-way, that is, it is computationally infeasible to derive the original message from it. Challenge/Response authentication uses a series of these hashed exchanges between the server and the client to establish the identity of the user before granting access to resources.

Basic authentication transmits the user name and password over the wire with Base64 encoding. Basic authentication can be extended to work with SSL if it is desirable to monitor who gets access to a web site.

Client certificate mapping involves using a client certificate that is a piece of digital ID for the users accessing a web site. It contains information about the user and is "signed" with a digital signature from the certification authority (CA) that issued the certificate. A digital signature is basically a hash of a message, in this case the certificate, that is encrypted with the sender's private key. The sender in this case is the CA.

IIS can be configured to ignore, accept, or require client certificates:

Ignore certificates: IIS does not care if a user sends their certificate with a request; IIS will simply authenticate the user using another method, such as Challenge/Response.

Accept certificates: If a client certificate is sent, IIS will use this certificate information to authenticate them. If no certificate is sent, IIS will use another method.

Require certificates: IIS will only fulfill requests from users with valid certificates.

IIS client certificate mapping associates, or maps, client certificate information with Windows NT user accounts. This form of authentication can be very secure and flexible. There are two methods that IIS uses to map client certificates to these accounts: many-to-one and one-to-one. The biggest difference between them is that one-to-one uses the actual certificate, whereas many-to-one only uses certain information contained in the certificate, such as the identity of the certificate issuer. With one-to-one mapping, if a user gets a new certificate, the old mapping will fail and a new mapping will have to be made for the new certificate. With many-to-one mapping, if the user gets a new certificate using the same information, the mapping will accept it as it did the old certificate.

Custom applications can be used where there is an existing database of user information that is desirable to use for authentication. Custom authentication applications can be Active Server Pages (ASP) applications, ISAPI filters, Java applets, Microsoft ActiveX controls, or COM objects. Custom applications can perform many security-related functions, such as authentication, IP address restriction, or access control.

For example, it can authenticate a user by using client certificates, prompting the user for their user name and password, or authenticating the user against a user information database.

Web Permissions

IIS implements a security mechanism referred to as "web permissions". Such permissions include Read and Write permissions. The web permissions define what particular operations are allowed on particular resources. Web permissions control which HTTP verbs are allowed to be executed for HTTP resources. HTTP verbs are commands that are sent in headers from browsers requesting actions on resources. Web permissions can be used in connection with other HTTP verbs, e.g. Web Distributed Authoring and Versioning (WebDAV) verbs. For example, a user may say, "I want to Read (GET) this web page." The header that is sent will specify the resource, and where it is located in cyberspace. Additionally, it will send the GET verb. This verb tells IIS that the requestor wants to "Read" the resource. Permissions that are set for the HTTP verbs do not control the NTFS file system permissions for the resources described just below.

NTFS Access Control Lists

The Windows NT File System (NTFS) implements its own security mechanism that defines similar read and write permissions. NTFS permissions control which user accounts have what type of access to resources on the hard disk. NTFS permissions are implemented through the use of Access Control Lists. An Access Control List (ACL) is a list of user accounts, user groups, and their privileges associated with a particular resource, such as a directory or file. Typically, ACLs are set by trial and error. They can also be heuristically determined in code based on the other security settings. Alternately, ACLs can comprise stored lists. For example, the file "MyISAPI.dll" would have a list of user accounts and user groups that can access it and what level of access they are granted to the file, such as Read, Write, or Execute. Each directory and file can have its own ACL that defines who can do what and where. An example of a heuristically-determined ACL is given below:

//What everyone except the administrator can do

Everyone$_{ACE}$=ACE$_{Null}$

If Access$_{WEB}$ and Read Then Everyone$_{ACE}$= (Everyone$_{ACE}$ or Read)

If Access$_{WEB}$ and Write Then Everyone$_{ACE}$= (Everyone$_{ACE}$ or Write)

If Access$_{WEB}$ and Execute Then Everyone$_{ACE}$= (Everyone$_{ACE}$ or Execute or Read)

If Access$_{WEB}$ and Script Then Everyone$_{ACE}$= (Everyone$_{ACE}$ or Read)

If Access$_{WEB}$ and DirectoryBrowse Then Everyone$_{ACE}$= (Everyone$_{ACE}$ or ListObject)

//What the administrator can do

Admin$_{ACE}$=ACE$_{FullControl}$

File$_{ACL}$=Admin$_{ACE}$+Everyone$_{ACE}$

| Where: | |
|---|---|
| ACE$_{Null}$ | Empty Access Control Entry |
| ACE$_{FullControl}$ | Access control Entry for Full Access |
| Everyone$_{ACE}$ | Valid access control for everyone |
| Admin$_{Ace}$ | Valid access control for the administrators group |
| Access$_{WEB}$ | Web permissions |
| File$_{ACL}$ | Access Control List for the file(s) in question |

Without synchronization that is provided by various described embodiments, inconsistencies can arise between the security settings that might be individually set by the user at the web permissions and file system levels.

For example, consider the following. Enabling read-only web permissions does not set read-only permissions in NTFS. This is because web permissions only control which HTTP verbs can be used in HTTP requests. However, if read-only is set in the NTFS, read only is set for the web permissions. Even if web permissions are set at Read and Write, if NTFS has read-only, the HTTP Write request will fail.

If web and NTFS permissions do not agree, the more restrictive of the two will be used for HTTP requests. For example, suppose a "SiteB" is set up as a web site that points to the folder "Site_B" on an NTFS drive. web permissions are set as Read and Write and NTFS permissions as Read. When a user tries to Write to http://www.SiteB.com, the request will fail. Even though IIS says it is alright to Write to the web site "SiteB", and therefore to the folder "Site_B", NTFS says it is not alright. If someone on the SiteB network tries to paste a file into Site_B, the same thing will happen.

Now, consider switching the permissions around: NTFS is Read and Write and web is read-only. The result is that the web user still cannot write to the web site because it denies permission. However, the network client can paste the file with ease because NTFS does not care about the IIS permissions. IIS can only govern HTTP requests, not file system requests. Thus, without synchronization, inconsistencies can arise that can frustrate system administrators and adversely impact the amount of time that must be spent troubleshooting the inconsistency.

Internet Protocol Restrictions

Access can be restriction based upon an identification that is associated with a particular user. For example, IP addresses are unique numbers identifying computers on a network. The IP address of the computer from which the user is making a request is always sent along with the request. Therefore, access can be granted or denied to server resources based upon the IP address of the requesting party. By selecting a "Grant Access" option, access is granted to everyone with the exception of those addresses that are specified. By selecting a "Deny Access" option, access is denied to everyone except the IP addresses that are specifically listed.

IP addresses can be specified individually or in groups. Domain or domain name system (DNS) names can also be specified. Using a domain name, such as "MyCompetitor.com", can preclude a competitor from accessing a particular web site.

Exemplary Architecture

Figure 5:
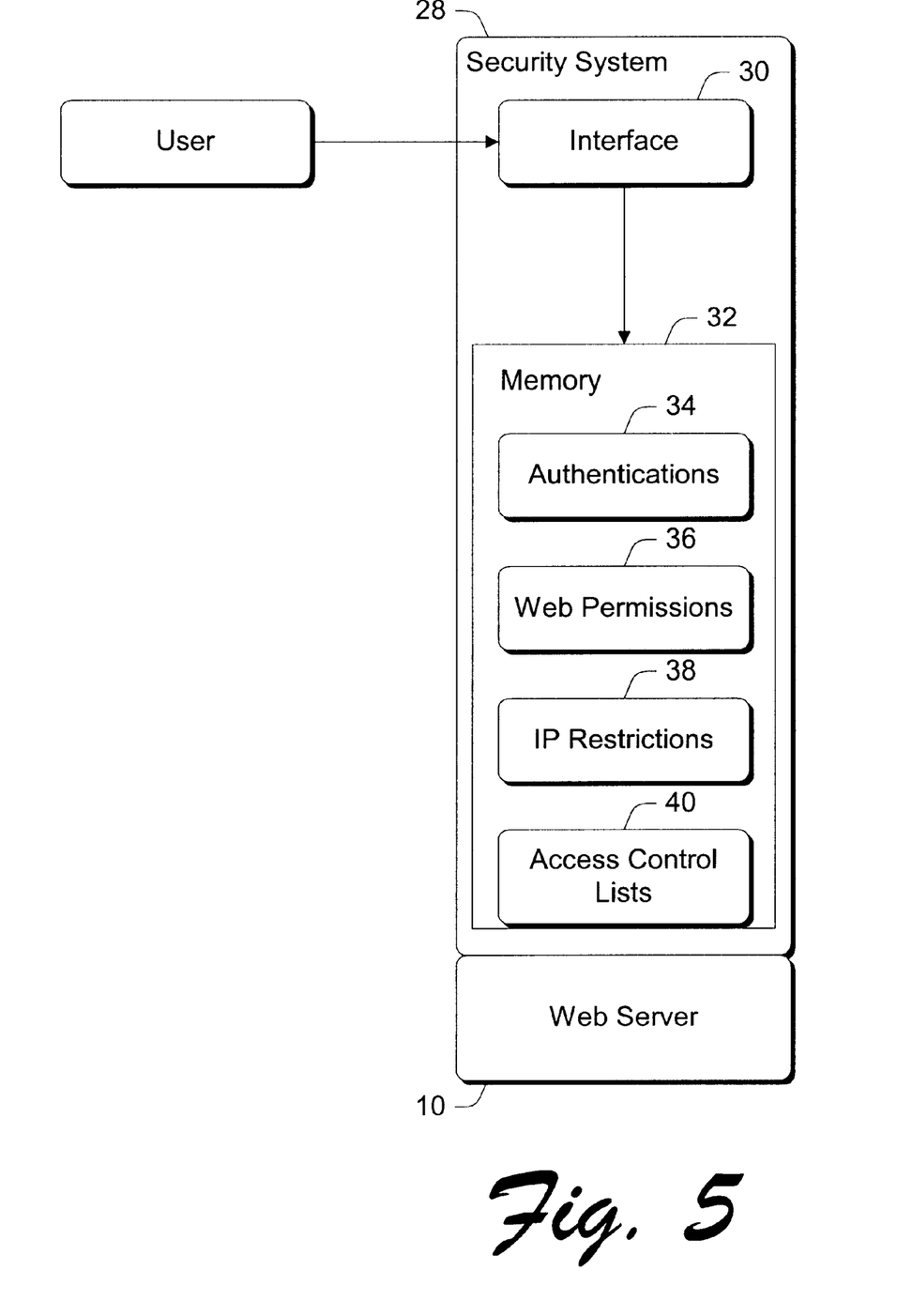
FIG. 5 is a high level diagram of a security system in accordance with one embodiment.

Within the setting of IIS, a metabase is provided and constitutes but one example of memory that stores virtually every setting that can be used in connection with IIS. This includes such things as every web server configuration (e.g. what a name space looks like, permissions, user custom error pages, and the like). FIG. 5 shows an exemplary architecture of a security system 28 in accordance with one embodiment. Security system 28 includes a user interface 30 that is presented to user. The user interface presents the security scenarios so that a user can select an appropriate one to apply. A memory location 32, e.g. the IIS metabase, is provided and the access control mechanisms, their associated settings, and the associated security scenarios are stored there. In this example, the access control mechanisms include an authentication mechanism 34, a web permissions mechanism 36, an IP restrictions mechanism 38, and an access control list mechanism 40. When a user wishes to set an appropriate level of security, they can access the various defined security scenarios through interface 30. A user can then select from among the provided security scenarios (see FIGS. 3 and 4), and have the security scenarios implemented as selected. The tables set forth below (each of which corresponds to a different selectable security scenario) give just a few examples of various security settings that can be set:

TABLE 1

| Access Control Mechanism | Security Setting |
| --- | --- |
| Authentication | Anonymous access denied |
| | Basic authentication |
| | Digest Authentication |
| | Integrated Windows Authentication |
| Web Permissions | Files can be viewed |
| | Scripts can be run |
| IP Address Restrictions | [None] |
| Access Control Lists | The following ACLs will replace the existing file ACLs: |
| | Administrators have full control |
| | Everyone has the following access permissions: |
| | Read |

TABLE 2

| Access Control Mechanism | Security Setting |
| --- | --- |
| Authentication | Anonymous users allowed |
| Web Permissions | Files can be viewed |
| | Scripts can be run |
| IP Address Restrictions | [None] |
| Access Control Lists | The following ACLs will replace the existing file ACLs: |
| | Administrators have full control |
| | Everyone has the following access permissions: |
| | Read, Read Control, Read attributes, Read Properties |

TABLE 3

| Access Control Mechanism | Security Setting |
| --- | --- |
| Authentication | Anonymous users allowed |
| | Integrated Windows authentication |
| Web Permissions | [None] |
| IP Address Restrictions | [None] |

TABLE 3-continued

| Access Control Mechanism | Security Setting |
| --- | --- |
| Access Control Lists | The following ACLs will replace the existing file ACLs: |
| | Administrators have full control |
| | Everyone has the following access permissions: |
| | [None] |

Figure 6:
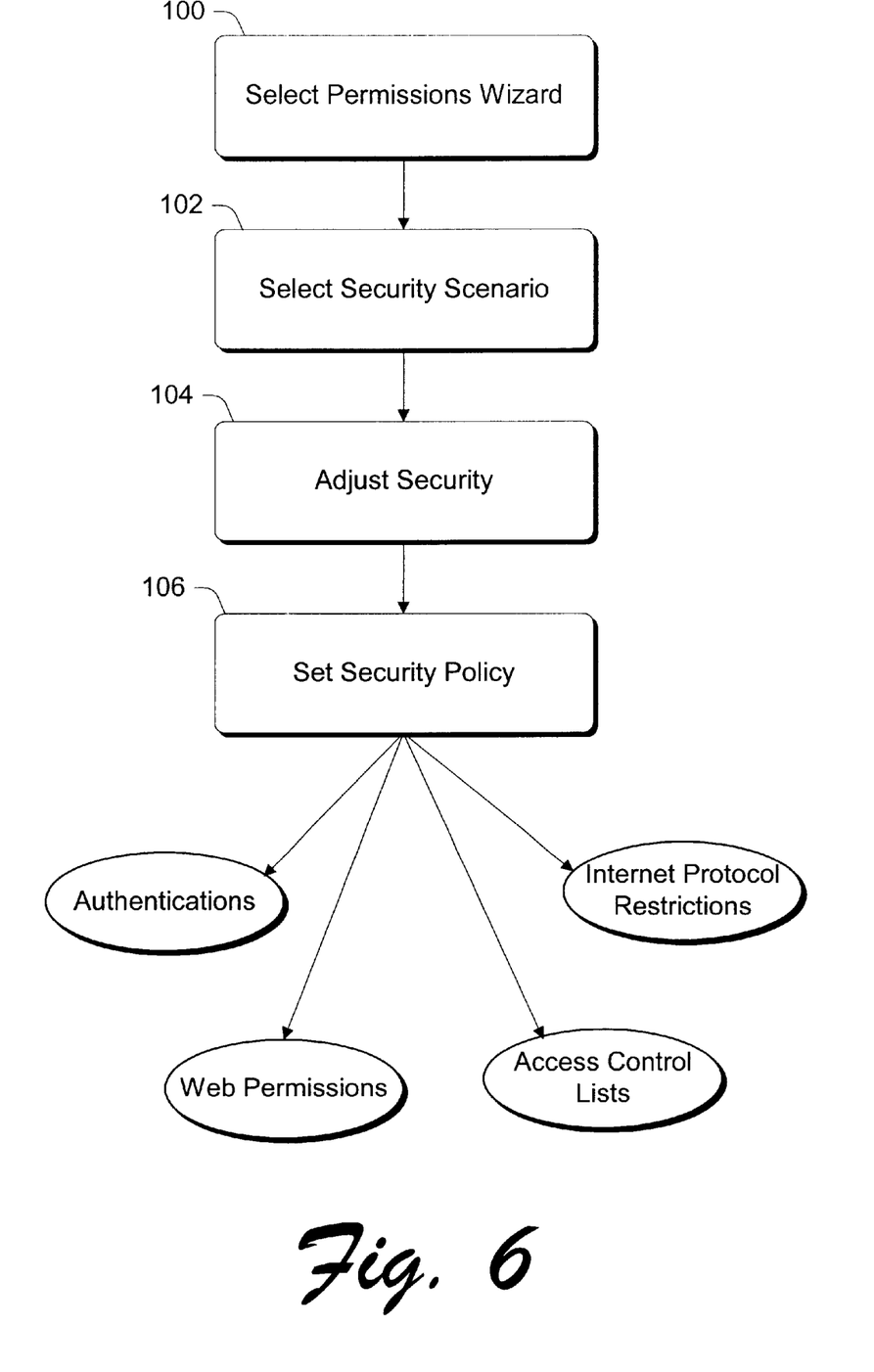
FIG. 6 is a flow diagram that shows steps in a method in accordance with one embodiment.

FIG. 6 is a flow diagram that illustrates one method in accordance with the invention. A user selects the security configuration tool (step 100) that enables them to configure security at their web site. In a reduction to practice embodiment, a security configuration tool called "Permissions Wizard" is offered by Microsoft as part of its IIS version 5.0. A user is then given the option to inherit security settings from another location. This is discussed in more detail below. If inheritance is not selected, the user then selects a security scenario (step 102) and the permissions wizard adjusts the security settings (step 104). The security settings can be selected to be a common set for all affected resources. A user can be given the option to adjust the default settings selected by the permissions wizard for a given security scenario. Alternately, the user can select to go with the security settings selected by the permission wizard. Either way, step 106 sets the security policy (applies the settings) that the user has selected through the permissions wizard. In this example, this can include setting the security settings for the authentications, the web permissions, the Internet protocol restrictions, and the access control lists.

The illustrated architecture brings the security settings for each access control mechanism under a single, unified selection mechanism where a user need not worry about individually setting security at the various security mechanisms. Rather, the user can select a scenario and have the settings automatically set for them. Of course, the user has the option of adjusting one or more of the security settings for one or more of the access control mechanisms if they so choose.

Third Party Access Control

Figure 7:
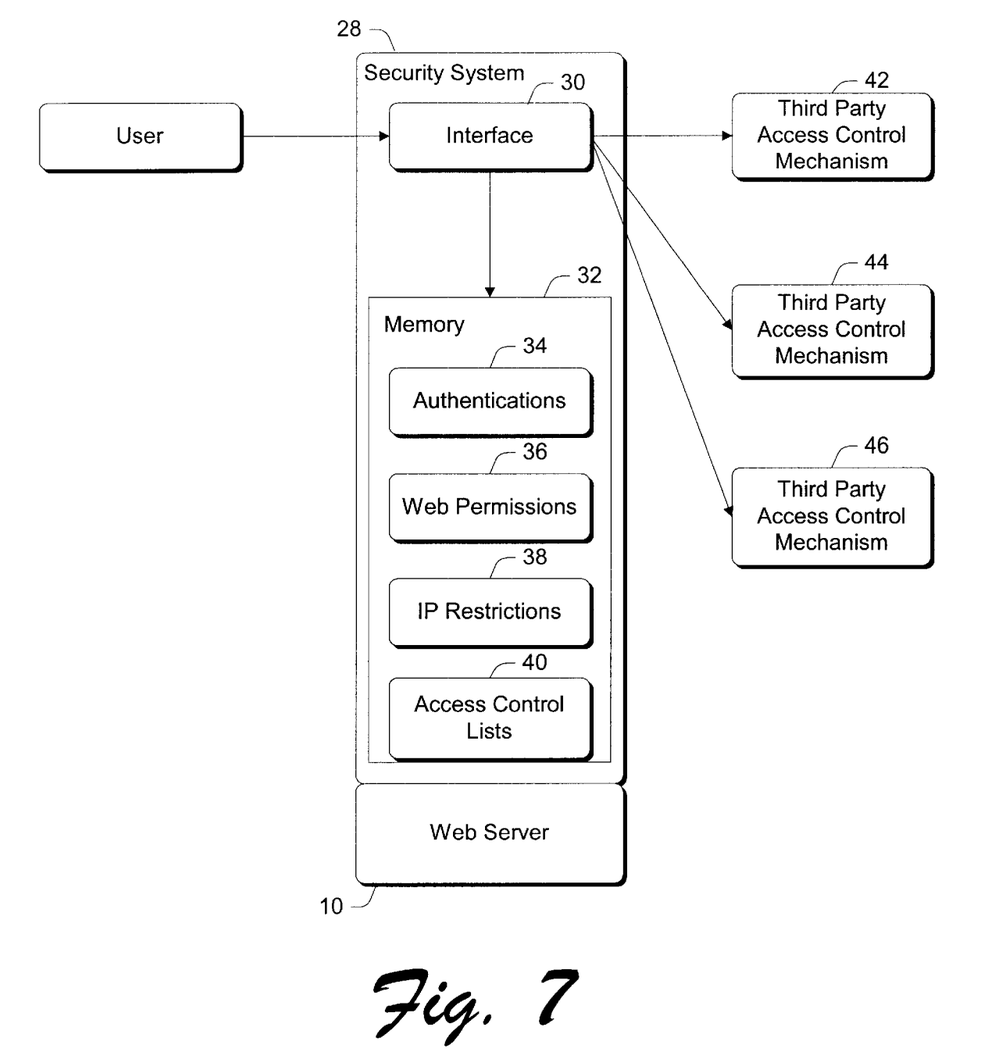
FIG. 7 is a high level diagram of a security system in accordance with one embodiment.

One embodiment enables security settings to be set for so-called third party access control mechanisms. This is shown diagrammatically in FIG. 7. There, three third party access control mechanisms 42, 44, and 46 are shown. The access control mechanisms, like the access control-mechanisms discussed above, control access to third party resources. In this example though, the resources are not controlled or managed by the web server 10. Rather, they are controlled or managed by a third party. One example of a third party resource can be a network file system (NFS) such as that which is used by Sun Microsystems. Each of the third party resources can expose access control mechanisms in a completely different way. By knowing how the access control mechanisms are exposed, security system 28 can be utilized to set the appropriate security settings.

Inheritance

In one embodiment, the concept of inheritance is utilized so that security settings can be passed within a hierarchical name space. In the context of IIS, the organization of the metabase supports this inheritance.

Figure 8:
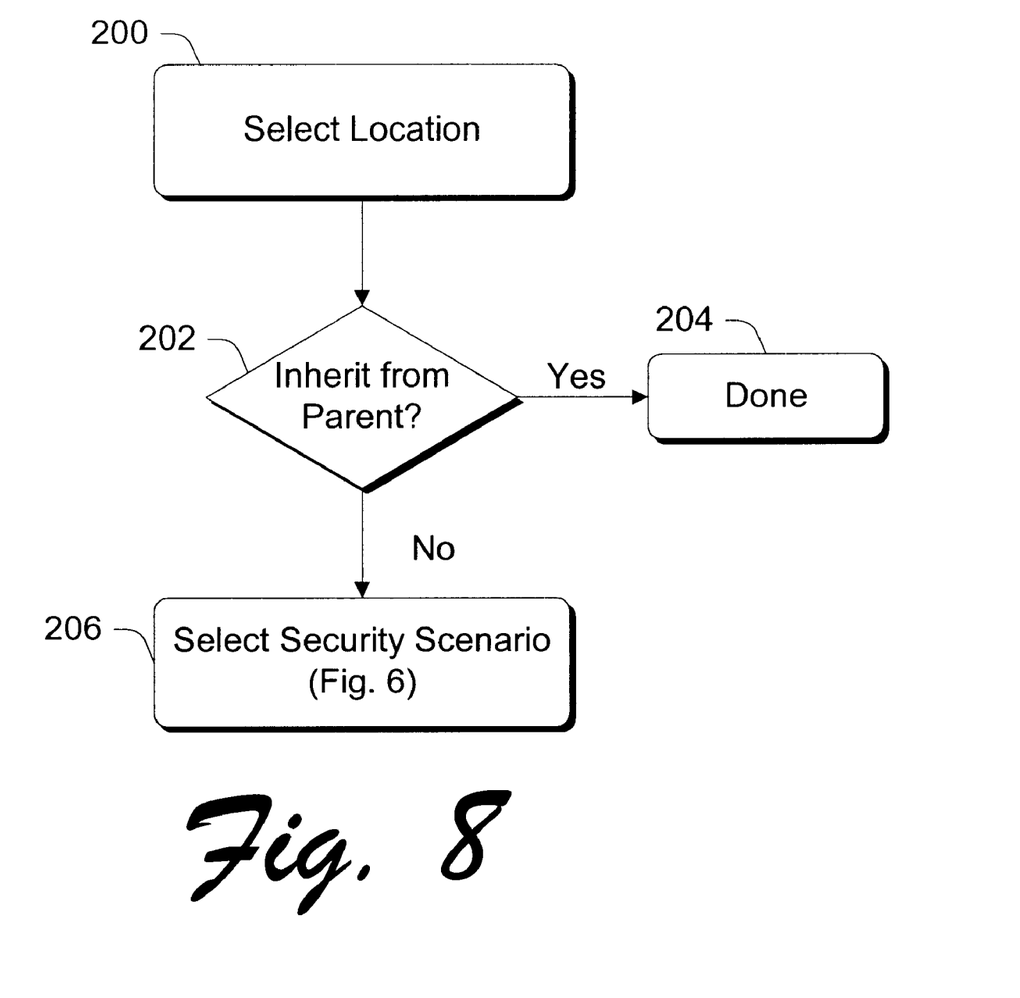
FIG. 8 is a flow diagram that shows steps in a method in accordance with one embodiment.

FIG. 8 shows a flow diagram that illustrates processing steps in accordance with one embodiment. A user first selects a location (step 200). The location is within a hierarchical name space and has assessable resources associated with it. For example, the location "splat" might be selected from a name space "w3svc/1/bar/foo/splat." This location might have a security setting "no SSL, Read/Write script" associated with it. The "bar" location might have the security setting "SSL Read Only" associated with it. Step 202 asks the user if they want to inherit the security settings for the selected location from the parent location or an upstream location. If the user opts to inherit the security settings from the parent or upstream location, then, in our example, "splat" would now have the security setting "SSL Read Only"—the same as its upstream location "foo". If the user chooses not to inherit the security settings, the step 206 then asks them to select from one or more security scenarios (just as was described in connection with FIG. 6).

Advantages of the various embodiments discussed above include those that stem from the fact that a user can now simultaneously set security settings that control access to resources that are accessible on or through a web site. Through the use of one or more security scenarios, a plurality of access control mechanisms that control access to various resources can be set. This eliminates a requirement for a user to individually set each of the access control mechanisms. In addition, troubleshooting in the event of a problem is greatly facilitated. This is because a troubleshooter can ascertain very quickly the state of the security system by knowing which security scenario was selected by a user and/or which access control mechanisms were changed. Thus, aspects of the invention provide enhanced simplicity in the implementation and administration of security systems having a plurality of different access control mechanisms. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for synchronizing access control in a web server comprising:

defining a plurality of security scenarios;

associating each security scenario with one or more security settings for a plurality of access control mechanisms that control access to a web server or to resources that are used by the web server; and setting one or more security settings for one or more of the access control mechanisms responsive to selection of a security scenario.

2. The method of claim 1, wherein one of the access control mechanisms comprises an authentication mechanism for authenticating various users.

3. The method of claim 1, wherein one of the access control mechanisms comprises a web permissions mechanism that defines what particular operations are allowed on particular resources.

4. The method of claim 1, wherein one of the access control mechanisms comprises an access restriction mechanism that can permit or deny access to a web site based upon an identification that is associated with a particular user.

5. The method of claim 1, wherein one of the access control mechanisms comprises an access control list (ACL) of user information and the privileges that are associated with a particular resource.

6. The method of claim 1, wherein the access control mechanisms comprise:

an authentication mechanism for authenticating various users;

a web permissions mechanism that defines what particular operations are allowed on particular resources;

an access restriction mechanism that can permit or deny access to a web site based upon an identification that is associated with a particular user; and an access control list (ACL) of user information and the privileges that are associated with a particular resource.

7. The method of claim 1, wherein the access control mechanisms comprise:

an authentication mechanism for authenticating various users;

an access restriction mechanism that can permit or deny access to a web site based upon an identification that is associated with a particular user; and an access control list (ACL) of user information and the privileges that are associated with a particular resource.

8. The method of claim 1, wherein the setting of the one or more security settings comprises setting a security setting of a third party access control mechanism that controls access to resources that are not managed by the web server.

9. The method of claim 1 further comprising adjusting one or more security settings for one or more of the access control mechanisms responsive to user input.

10. An access controller for a web server comprising:

a memory;

an association stored in the memory of a plurality of security scenarios and one or more correlated security settings for a plurality of access control mechanisms that control access to a web server or to resources that are used by the web server, the security settings for the plurality of access control mechanisms being settable through selection of a correlated security scenario.

11. The access controller of claim 10, wherein one of the access control mechanisms comprises an authentication mechanism for authenticating various users.

12. The access controller of claim 10, wherein one of the access control mechanisms comprises a web permissions mechanism that defines what particular operations are allowed on particular resources.

13. The access controller of claim 10, wherein one of the access control mechanisms comprises an access restriction mechanism that can permit or deny access to a web site based upon an identification that is associated with a particular user.

14. The access controller of claim 10, wherein one of the access control mechanisms comprises an access control list (ACL) of user information and the privileges that are associated with a particular resource.

15. The access controller of claim 10, wherein one of the access control mechanisms comprises a third party access control mechanism that controls access to resources that are not managed by the web server.

16. The access controller of claim 10 further comprising a user interface configured to present a user with one or more user-selectable security scenarios.

17. A web server comprising:

a plurality of access control mechanisms, each access control mechanism being configured to control access to the web server or to resources that are used by the web server, and having one or more settable security settings; and a plurality of security scenarios each being associated with one or more security settings of one or more access control mechanisms, the security scenarios being selectable by a user to automatically set the security settings of the one or more access control mechanisms with which the security scenario is associated.

18. The web server of claim 17, wherein one of the access control mechanisms comprises an authentication mechanism for authenticating various users.

19. The web server of claim 17, wherein one of the access control mechanisms comprises a web permissions mechanism that defines what particular operations are allowed on particular resources.

20. The web server of claim 17, wherein one of the access control mechanisms comprises an access restriction mechanism that can permit or deny access to a web site based upon an identification that is associated with a particular user.

21. The web server of claim 17, wherein one of the access control mechanisms comprises an access control list (ACL) of user information and the privileges that are associated with a particular resource.

22. The web server of claim 17, wherein the plurality of access control mechanisms comprise at least two of the following:
    an authentication mechanism for authenticating various users;
    a web permissions mechanism that defines what particular operations are allowed on particular resources;
    an access restriction mechanism that can permit or deny access to a web site based upon an identification that is associated with a particular user; and
    an access control list (ACL) of user information and the privileges that are associated with a particular resource.

23. A method of synchronizing access control in a web server comprising:
    selecting a location within a hierarchical namespace, the location being associated with accessible resources;
    presenting a user with an option to inherit security settings from an upstream location in the hierarchical namespace, the security settings setting security for a plurality of access control mechanisms that control access to a location's accessible resources; and
    inheriting the security settings from the upstream location responsive to a user opting to do so.

24. The method of claim 23 further comprising presenting the user with an option to select from one or more security scenarios, each security scenario being associated with one or more security settings for a plurality of access control mechanisms that control access to resources associated with the web server.

25. The method of claim 23, wherein one of the access control mechanisms comprises an authentication mechanism for authenticating various users.

26. The method of claim 23, wherein one of the access control mechanisms comprises a web permissions mechanism that defines what particular operations are allowed on particular resources.

27. The method of claim 23, wherein one of the access control mechanisms comprises an access restriction mechanism that can permit or deny access to resources based upon an identification that is associated with a particular user.

28. The method of claim 23, wherein one of the access control mechanisms comprises an access control list (ACL) of user information and the privileges that are associated with a particular resource.

29. The method of claim 23, wherein the plurality of access control mechanisms comprise:
    an authentication mechanism for authenticating various users;
    a web permissions mechanism that defines what particular operations are allowed on particular resources;
    an access restriction mechanism that can permit or deny access to resources based upon an identification that is associated with a particular user; and
    an access control list (ACL) of user information and the privileges that are associated with a particular resource.

30. A method for synchronizing access control to resources that are accessible through a web server comprising:
    storing a plurality of security scenarios, each security scenario being associated with one or more security settings for a plurality of access control mechanisms that control access to resources;
    accessing a stored security scenario; and
    setting the security settings that are associated with an accessed security scenario.

31. The method of claim 30, wherein the setting of the security settings comprises setting security settings of a third party access control mechanism that controls access to resources that are not managed by the web server.

32. The method of claim 30, wherein one of the access control mechanisms comprises an authentication mechanism for authenticating various users.

33. The method of claim 30, wherein one of the access control mechanisms comprises a web permissions mechanism that defines what particular operations are allowed on particular resources.

34. The method of claim 30, wherein one of the access control mechanisms comprises an access restriction mechanism that can permit or deny access to a web site based upon an identification that is associated with a particular user.

35. The method of claim 30, wherein one of the access control mechanisms comprises an access control list (ACL) of user information and the privileges that are associated with a particular resource.

36. A computer-readable medium having computer-readable instructions stored thereon, which, when executed by a computer perform the following steps:
    storing a plurality of security scenarios, each security scenario being associated with one or more security settings for a plurality of access control mechanisms that control access to resources, the access control mechanisms comprising:
    an authentication mechanism for authenticating various users;
    an access restriction mechanism that can permit or deny access to a web site based upon an identification that is associated with a particular user; and
    an access control list (ACL) of user information and the privileges that are associated with a particular resource; accessing a stored security scenario; and setting the security settings that are associated with an accessed security scenario.

* * * * *